United States Patent [19]

Pelta

[11] Patent Number: 4,930,856
[45] Date of Patent: Jun. 5, 1990

[54] TERMINATION FOR FLEXIBLE LIGHT-TRANSMITTING CABLES

[75] Inventor: Samuel Pelta, Philadelphia, Pa.

[73] Assignee: Pilling Co., Fort Washington, Pa.

[21] Appl. No.: 829,617

[22] Filed: Feb. 14, 1986

[51] Int. Cl.⁵ .............................................. G02B 6/36
[52] U.S. Cl. ................................. 350/96.2; 350/96.23
[58] Field of Search ............... 350/96.20, 96.21, 96.22, 350/96.23

[56] References Cited

U.S. PATENT DOCUMENTS

| | | | |
|---|---|---|---|
| 3,699,950 | 10/1972 | Humphrey, Jr. et al. | 128/23 |
| 3,758,189 | 9/1973 | Godrino | 350/96.20 |
| 4,073,050 | 2/1978 | Kloots | 29/450 |
| 4,082,422 | 4/1978 | Kloots | 350/96.23 |
| 4,534,617 | 8/1985 | Kloots et al. | 350/96.20 |

FOREIGN PATENT DOCUMENTS 2461964 3/1981 France .................................. 350/96.2

Primary Examiner—John D. Lee
Assistant Examiner—John Ngo
Attorney, Agent, or Firm—Howson & Howson

[57] ABSTRACT

The flexible sheath of a fiberoptic cable is clamped to an externally grooved tubular insert by an O-ring engaged by a frusto-conical portion of the internal wall of a compression fitting. The compression fitting applies an inward force to the O-ring, urging the sheath into the groove on the insert. The compression fitting is secured to a termination connector by adhesive and also by a cooperating ridge and groove which snap together. The termination connector engages the tubular insert. The compression fitting, which is secured to the termination connector cannot back away from the termination connector. Therefore, the frusto-conical portion of the inner wall of the compression fitting maintains inward pressure on the O-ring and the ring presses the sheath tightly into the groove.

9 Claims, 2 Drawing Sheets

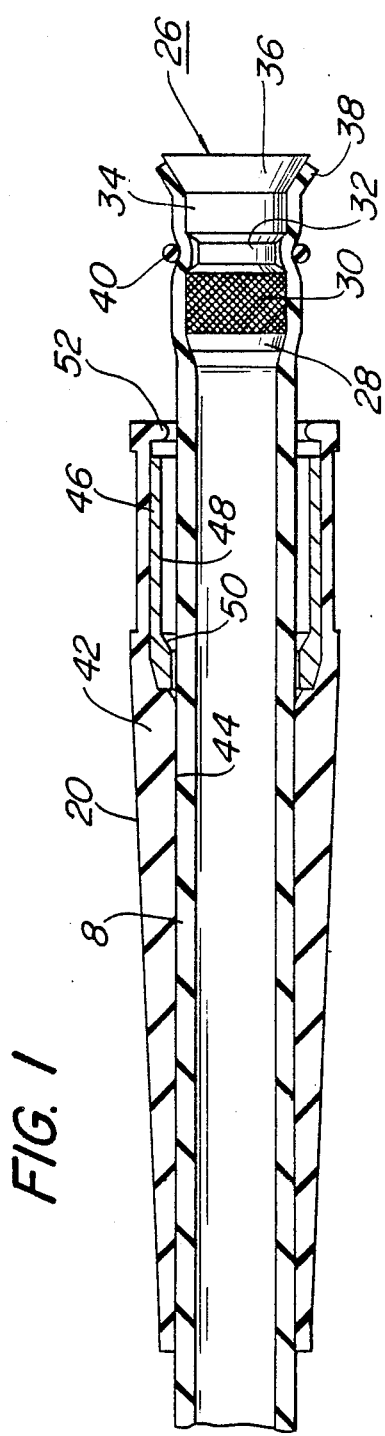
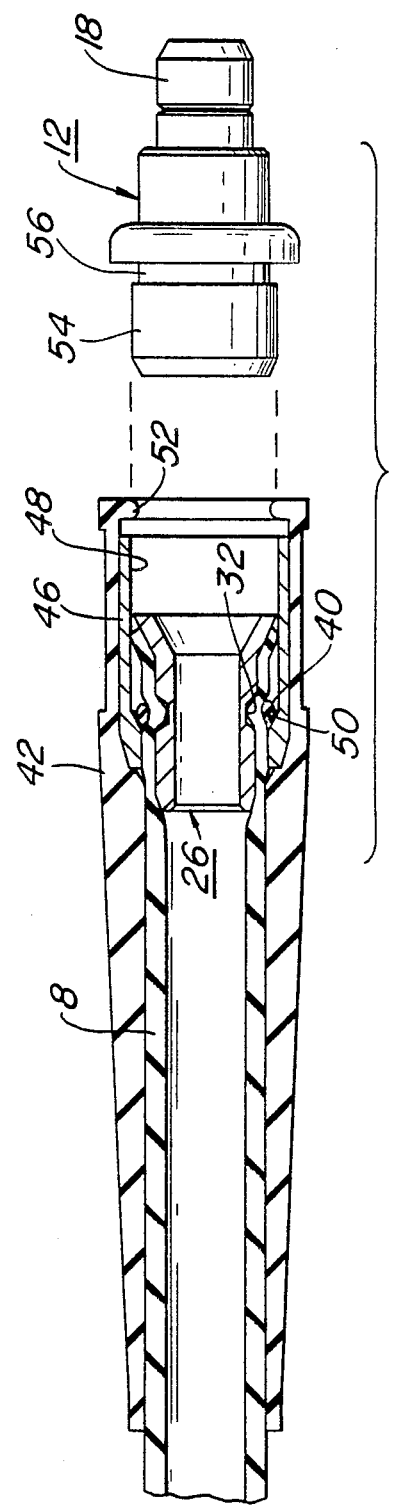

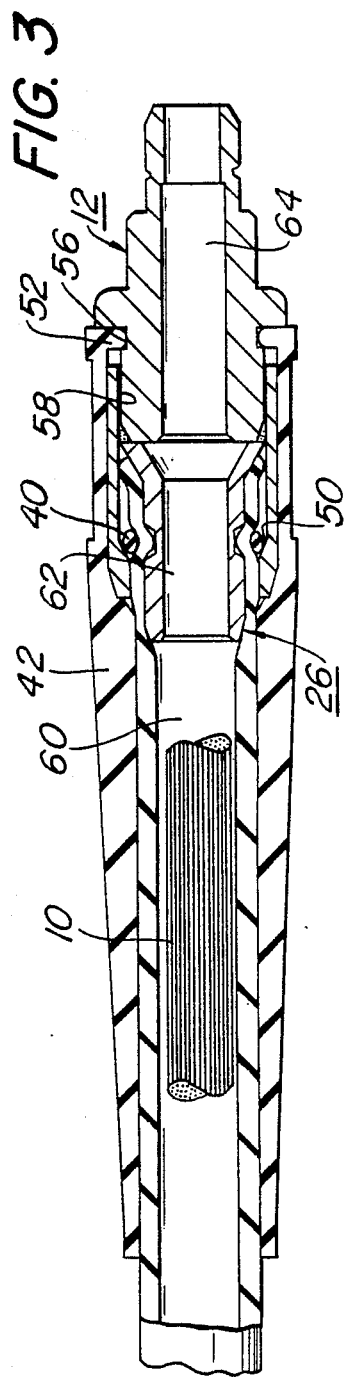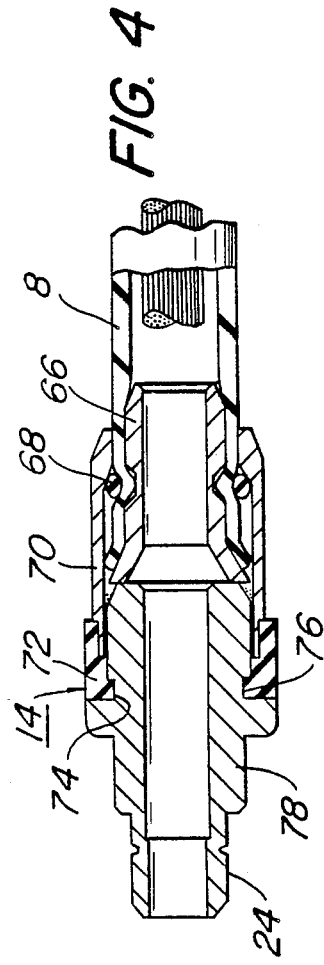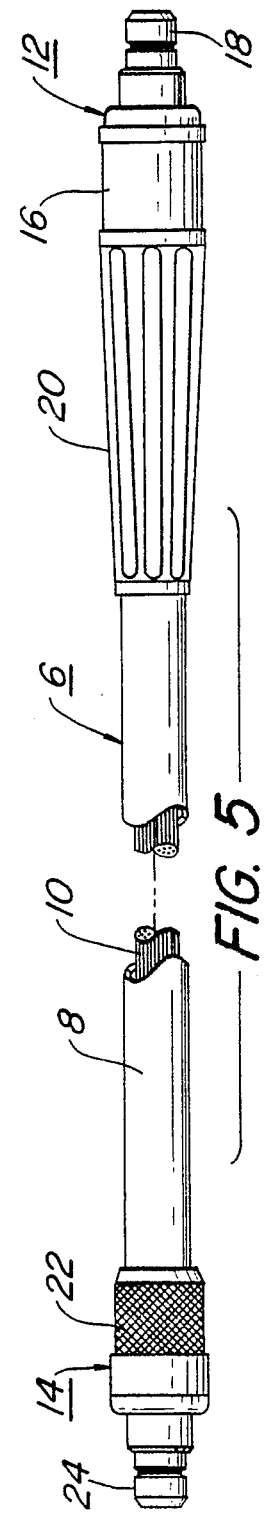

TERMINATION FOR FLEXIBLE LIGHT-TRANSMITTING CABLES

BRIEF SUMMARY OF THE INVENTION

This invention relates to flexible light-transmitting cable assemblies comprising bundles of light-conducting fibers encased in a tubular elastomeric sheath. It relates particularly to an improved termination for such cables.

One major application for flexible light-transmitting cables is surgery, where there is frequent need for directing high-intensity, low temperature light onto an area of the body. Flexible light-transmitting cables are frequently used to conduct light from a light source to a surgeon's headlight, or from a light source to an instrument such as a speculum or endoscope.

To be sterilizable, and replaceable in the event of fiber breakage, the light-transmitting cable must be disconnectable from the light source and from the headlight or instrument. For this purpose, terminations are provided at both ends of the cable. Each termination includes a connector adapted to attach to the light source, headlight or instrument. It also includes means for securing the fibers and the sheath to the connector, and may also include a strain relief designed to prevent sharp bending of the cable where it enters the rigid parts of the termination, in order to reduce the likelihood of damage to the fibers when the cable is inadvertently pulled in a direction other than along the axis of the termination.

Examples of terminations for flexible light-conducting cables are found in the following U.S. Pat. Nos.:

| | | |
|---|---|---|
| Humphrey, Jr. et al. | U.S. Pat. No. 3,699,950 | Oct. 24, 1972 |
| Kloots | U.S. Pat. No. 4,073,050 | Feb. 14, 1978 |
| Kloots | U.S. Pat. No. 4,082,422 | Apr. 4, 1978 |
| Kloots | U.S. Pat. No. 4,534,617 | Aug. 13, 1985 | and in pending U.S. Pat. application Ser. No. 460,762, filed by John R. Richards on Jan. 25, 1983.

In the Humphrey, Jr. et al. patent, a seal is maintained between the flexible sheath and an end cap by virtue of a bonding material holding two mating surfaces together. Any force tending to pull the sheath out of the end cap exerts tension directly on the bonding material.

In Kloots Pat. No. 4,073,050, the flexible sheath is connected to a metal part of a termination by virtue of an external moldable casing formed in such a way that it is in contact with both the sheath and the metal part.

In Kloots Pat. No. 4,082,422, the flexible sheath extends into a metal part of the termination, and the portion of the sheath within the metal part is coated with an adhesive. Any force tending to pull the sheath out of the metal part exerts a shear directly on the adhesive.

In Kloots Pat. No. 4,534,617, the flexible sheath extends over a metal sleeve having an annular groove and is clamped to the sleeve by means of a wire encircling the sheath at the axial location of the groove.

In the Richards application, the flexible sheath extends over a part of a fitting having a tapered exterior surface, and is clamped to the tapered surface by a ferrule which is threaded onto a threaded portion of the fitting.

The principal object of this invention is to provide a cable termination having a positive and secure mechanical connection between the flexible sheath and the cable connector, which is nevertheless simple in construction and easily assembled. It is also an object of the invention to avoid depending directly on adhesives or molded parts to secure the flexible sheath to the termination, and to avoid the need for threaded parts.

The flexible light-transmitting cable assembly in accordance with the invention comprises a bundle of light-conducting fibers extending through a flexible, tubular elastomeric sheath having a predetermined relaxed internal diameter. The cable termination comprises a tubular insert located at one end of the sheath between the bundle of light-conducting fibers and the inner wall of the sheath. The insert has a central passage through which the bundle extends, and an external wall at least part of which is larger in diameter than the relaxed internal diameter of the sheath. The external wall stretches the end of the sheath outwardly beyond its relaxed internal diameter. An annular groove is formed in the external wall, and a ring surrounds the sheath at the axial location of the annular groove. A compression fitting surrounds the sheath near one end, and also surrounds the ring. The compression fitting has an inner wall comprising a cyclindrical section extending over the sheath and beyond the end of the sheath. The inner wall of the compression fitting also comprises a tapered, preferably frusto-conical, section located over the sheath, the larger diameter end of the tapered section being nearer the end of the sheath than is the smaller diameter end. The tapered section is in contact with the ring and exerts an inwardly-directed compressive force on the ring. The ring, in response to the force exerted by the compression fitting, exerts an inwardly-directed compressive force on the sheath, urging the sheath tightly into the groove. The termination also comprises an end fitting having a cylindrical outer wall at one end thereof, the outer wall having a portion located inside, and substantially conforming to, a portion of the cylindrical section of the inner wall of the compression fitting, the end fitting also having a connector at the opposite end thereof. The preferred embodiment of the invention includes a sealant coating the conforming portions of the outer wall of the end fitting and the inner wall of the compression fitting. In a preferred form of the invention, a portion of the external wall of the tubular insert at the end thereof nearest said one end of the sheath is flared outwardly so that its internal passage is flared, facilitating insertion of the fiber bundle. For securing the end fitting to the compression fitting, there is preferrably provided a semi-rigid extension fixed to the compression fitting, the extension having an annular inwardly projecting ridge, and the end fitting having a groove receiving the ridge. A semi-rigid strain relief may extend over a part of the sheath, and the strain relief and the semi-rigid extension may be a unitary molded element. Preferably, the ridge and the groove receiving the ridge fit together by way of a snap fit.

Further objects and advantages of the invention will be apparent from the following detailed description when read in conjunction with the drawings.

BRIEF DESCRIPTION OF THE DRAWINGS

FIG. 1 is an axial section through a partially assembled cable termination;

FIG. 2 is an axial section through the cable termination in a later stage of the assembly process;

FIG. 3 is an axial section through the cable termination in its fully assembled condition, but showing only a fragment of the fiber bundle;

FIG. 4 is an axial section through an alternative form of cable termination; and FIG. 5 is a fragmentary elevational view showing both ends of a cable equipped with terminations in accordance with the invention.

DETAILED DESCRIPTION

In FIG. 5, cable 6 is a typical flexible light-transmitting cable for surgical use. It comprises an elastomeric sheath 8, preferably of silicone rubber, a bundle of optical fibers 10 within the sheath, and terminations 12 and 14 at its ends. Terminations 12 is designed for connection to a light source. It comprises a grasping section 16, a grooved connector 18, and a strain relief 20. Termination 14 is designed to be connected to a surgeon's headlight or to an instrument. It comprises a grasping section 22 and a grooved connector 24, but lacks a strain relief. The grooved connectors are designed to be quickly connected to, and disconnected from, sockets in the light source and in the headlight or instrument. Several standard connector configurations are in use in surgical light-transmitting cables, and any of these connector configurations can be used in the termination of the present invention.

FIGS. 1,2 and 3 illustrate the steps necessary for assembly of termination 12. As shown in FIG. 1, one end of sheath 8 is stretched over tubular insert 26. The insert has a tapered section 28 to facilitate entry of the insert into the sheath. It has a cylindrical section 30, which is optionally knurled, but can be smooth. Next to section 30 is a groove 32 having tapered sides. A second cylindrical section 34 is located on the opposite side of the groove. Next to section 34 is an outwardly flared section. The diameters of cylindrical sections 30 and 34 are preferably the same, and slightly larger than the relaxed internal diameter of sheath 8. Thus sections 30 and 34 stretch the sheath. The sheath is also stretched outwardly over the flared section of the insert at 38. Insert 26 has an internal passage extending from one end to the other, as shown in FIGS. 2 and 3. The inner wall of the flared section is also flared for facilitating insertion of the fiber bundle into the sheath through the tubular insert.

As shown in FIG. 1, a ring 40 is positioned over the exterior of sheath 8 at the axial location of groove 32. The ring is preferably a synthetic rubber O-ring. However, various alternative rings, such as split metal rings, can be used. The internal diameter of the ring is such as to press the sheath partway into groove 32.

Strain relief 42 is a molded silicone rubber element preferably formulated to have a durometer hardness in the range of 60–70. Thus, the strain relief is relatively hard compared to sheath 8. The strain relief has a cylindrical inner wall 44 having a diameter approximately equal to the relaxed outer diameter of the sheath, so that it conforms to the sheath as shown in FIG. 1. Near the end of the strain relief closest to the end of the cable, the internal passage widens to accommodate a compression fitting 46. The compression fitting is preferably metal, and is permanently set in place in the strain relief in the molding process. It has an internal passage with a cylindrical wall section 48 and a tapered wall section 50. The cylindrical wall section 48 is large enough to slide over ring 40. However, the tapered wall section faces ring 40 and is dimensioned so that it will touch ring 40 when the strain relief is pushed toward the end of the cable. At the end of the strain relief is an inwardly projecting annular ridge 52 which is designed to snap into a groove in a connector.

When the strain relief is pushed toward the end of the cable, the strain relief and cable are related as shown in FIG. 2. Frusto-conical wall section 50 engages ring 40, compressing it radially inwardly. The ring, in turn, presses sheath 8 tightly into groove 32 of insert 26. Thus, the ring causes the sheath to be sealed tightly to insert 26. It also forms a seal between the sheath and compression fitting 46.

Connector 18, as shown in FIG. 2 is a machined metal element having a cylindrical exterior surface 54 slightly smaller in diameter than the internal diameter of wall 48 of the compression fitting. Next to surface 54 is a groove 56 designed to receive inwardly projecting annular ridge 52 at the end of the strain relief.

In FIG. 3, the connector is inserted into the end of the cable assembly. A sealant-adhesive, such as an epoxy resin compound is applied at 58 to the outer surface 54 of the connector in order to secure surface 54 to the inner wall 48 of the compression fitting and to provide a seal. Ridge 52 snaps into groove 56 to hold the connector in position as the epoxy hardens. The inner end of the connector abuts the end of the flared portion of insert 26 when the ridge and groove are engaged.

When the epoxy sealant-adhesive hardens, the connector 12 and the compression fitting are firmly secured together. Because of the adhesive and also because of the snap fit of ridge 52 into groove 56, the compression fitting cannot back away from the connector. Consequently, tapered wall 50 of the compression fitting maintains inward pressure on ring 40, and the ring presses sheath 8 tightly into groove 32. While the compression fitting and the connector are held together in part by adhesive, there is no direct dependence on adhesive to secure the sheath to the insert and to the strain relief. That is, if the sheath is pulled in a direction away from the strain relief, no shear or tensile force is applied to the adhesive. The integrity of the assembly in FIG. 3 is partially dependent on adhesive. However, the adhesive is between closely conforming surfaces of rigid metal parts, and is much less likely to be loosened by mechanical forces than is an adhesive connection between a rigid part and a flexible part.

Fiber bundle 10 extends through passage 60 in the sheath, through passage 62 in the insert, and through passage 64 in the connector. In the finished product, the end of the fiber bundle is flush with the opening at the end of the connector, and cemented and polished at that location.

The termination at the instrument end is similar to the termination at the light source end. The only substantial difference is that, at the instrument end, the termination does not have a strain relief. As shown in FIG. 4, the instrument end termination 14 comprises an insert 66 similar to insert 26, a compressible ring 68 similar to ring 40, and a compression fitting 70. The compression fitting is not molded into a strain relief as is fitting 46. However, secured to fitting 70 is a molded, semi-rigid, ring-shaped element 72 having an internal ridge 74 capable of snapping into groove 76 in the outer wall of end fitting 78. The connector shown is identical to connector 12, but can have any end configuration necessary to adapt the cable to the instrument with which it is to be used. As is the case at the opposite end of the cable, the compression fitting has a tapered inner wall section which presses ring 68 inwardly, forcing sheath 8 tightly into a groove in insert 66. The connector is snapped into place after being coated with an adhesive on the cylindrical portion of its outer wall which enters the cylindrical portion of the compression fitting.

A cable such as that shown in FIG. 5 is typically assembled by first placing a strain relief, with a compression fitting molding into it, over a sheath, as shown in FIG. 1. A tubular insert corresponding to insert 26 is then pushed into the end of the sheath, and a ring 40 is positioned over the sheath at the location of groove 32. The strain relief is then pushed toward and over the end of the sheath, as shown in FIG. 2, causing the tapered inner wall section 50 to push ring 40 inwardly, thereby locking the sheath to the insert. The ring also stops the strain relief from further movement over the end of the sheath. A fiber bundle may be inserted into the sheath at this time through the flared end of the insert. The bundle should be long enough that short lengths of the bundle extend beyond the partial cable assembly at both ends. The opposite end of the cable is then assembled by positioning fitting 70, with its molded element 72 over the sheath, pushing insert 66 over the optical fiber bundle and into the sheath, positioning ring 68 over the sheath, and pushing compression fitting 70 toward and over the end of the sheath.

Assemblies including the sheath, inserts, compression fittings and O-rings, and containing fiber bundles with short lengths extending out of both ends can be easily made, kept in stock, and fitted with connectors of any desired configuration, as needed. These partial assemblies can also be dismantled easily to salvage parts.

When the end fittings with connectors are to be fitted to the partial assemblies, the outer cylindrical walls of the connectors, corresponding to wall 54 in FIG. 2, are coated with an adhesive sealant such as an epoxy resin with hardener. The end fittings are then inserted into the cylindrical parts of the compression fittings and snapped into place. The ends of the fiber bundles projecting beyond the connectors are cut nearly flush with the connector openings, coated with the same epoxy mixture as used to secure the end fittings to the compression fittings, and polished for optimum light-transmitting properties.

Assembly of the cable termination in accordance with the invention is remarkably easy and smooth. A very secure connection is provided between the sheath and the various parts of the termination, and the interior of the sheath is reliably sealed against the entry of contaminants. The termination is usable with any of a variety of connector configurations. It can, of course, be modified in various respects. For example, the strain relief can be used in some cases at both ends of the cable. Rings such as metal split rings can be used in place of the elastomeric O-rings. The shapes of the inserts an compression fittings can be modified in various respects. These and various other modifications can be made to the terminations and cable described herein without departing from the scope of the invention as defined in the following claims.

I claim:

1. In a flexible light-transmitting cable assembly comprising a bundle of light-conducting fibers extending through a flexible, tubular elastomeric sheath having a predetermined relaxed internal diameter, a cable termination comprising:

a tubular insert located at one end of the sheath between the bundle of light-conducting fibers and the inner wall of the sheath, said insert having a central passage through which said bundle extends, an external wall at least part of which is larger in diameter than the relaxed internal diameter of the sheath, said external wall stretching said one end of the sheath outwardly beyond its relaxed internal diameter, and an annular groove in said external wall;

a ring surrounding said sheath at the axial location of said annular groove;

a compression fitting surrounding said sheath at said one end thereof and also surrounding said ring, said compression fitting having an inner wall comprising a cylindrical section extending over the sheath and beyond said one end thereof, and said inner wall also comprising a tapered section located over the sheath, the larger diameter end of the tapered section being nearer said one end of the sheath than is the smaller diameter end thereof, said tapered section being in contact with said ring, and said tapered section exerting an inwardly-directed compressive force on said ring, and said ring, in response, exerting an inwardly-directed compressive force on said sheath, urging the sheath tightly into said groove; and an end fitting having a cylindrical outer wall at one end thereof, said outer wall having a portion located inside, and substantially conforming to, a portion of said cylindrical section of the inner wall of the compression fitting, said end fitting and said insert being separate elements, and said end fitting also having a connector at the opposite end thereof, and a semi-rigid extension fixed to the compression fitting, said extension having an annular inwardly projecting ridge, and said end fitting having a groove receiving said ridge.

2. A flexible light-transmitting cable assembly according to claim 1 also having a semi-rigid strain relief extending over a part of the sheath, wherein the strain relief and the semi-rigid extension are a unitary molded element.

3. A flexible light-transmitting cable assembly according to claim 1 in which the ridge and the groove receiving the ridge fit together by way of a snap fit.

4. In a flexible light-transmitting cable comprising a bundle of light-conducting fibers extending through a flexible, tubular elastomeric sheath having a predetermined relaxed internal diameter, a cable termination comprising:

a tubular insert located at one end of the sheath between the bundle of light-conducting fibers and the inner wall of the sheath, said insert having a central passage through which said bundle extends, an external wall at least part of which is larger in diameter than the relaxed internal diameter of the sheath, said external wall stretching said one end of the sheath outwardly beyond its relaxed internal diameter, and an annular groove in said external wall;

a ring surrounding said sheath at the axial location of said annular groove;

a compression fitting surrounding said sheath at said one end thereof and also surrounding said ring, said compression fitting having an inner wall comprising a cylindrical section extending over the sheath and beyond said one end thereof, and said inner wall also comprising a tapered section located over the sheath, the larger diameter end of the tapered section being nearer said one end of the sheath than is the smaller diameter end thereof, said tapered section being in contact with said ring, and said tapered section exerting an inwardly-directed compressive force on said ring, and said ring, in response, exerting an inwardly-directed compressive force on said sheath, urging the sheath tightly into said groove; and an end fitting having a cylindrical outer wall at one end thereof, said outer wall having a portion located inside, and substantially conforming to, a portion of said cylindrical section of the inner wall of the compression fitting, said end fitting and said insert being separate elements, and said end fitting also having a connector at the opposite end thereof, and in which the end fitting is rigidly connected to the compression fitting and in which the insert includes means for engaging the end fitting and for preventing the end fitting and compression fitting from moving relative to the sheath and ring in a direction such as to release said inwardly-directed forces.

5. A flexible light-transmitting cable according to claim 7 having a sealant coating the conforming portions of the outer wall of the end fitting and the inner wall of the compression fitting.

6. A flexible light-transmitting cable assembly according to claim 4 in which the internal wall of the tubular insert at the end thereof nearest said one end of the sheath is flared outwardly.

7. A flexible light-transmitting cable assembly according to claim 4 having a semi-rigid extension fixed to the compression fitting, said extension having an annular inwardly projecting ridge, and said end fitting having a groove receiving said ridge.

8. A flexible light-transmitting cable assembly according to claim 7 also having a semi-rigid strain relief extending over a part of the sheath, wherein the strain relief and the semi-rigid extension are a unitary molded element.

9. A flexible light-transmitting cable assembly according to claim 7 in which the ridge and the groove receiving the ridge fit together by way of a snap fit.

* * * * *